US00RE34237E

United States Patent [19]

Sole

[11] E Patent Number: Re. 34,237

[45] Reissued Date of Patent: Apr. 27, 1993

[54] BANANA PROCESSING

[75] Inventor: Pedro Sole, Cincinnati, Ohio

[73] Assignee: Chiquita Brands, Inc., Cincinnati, Ohio

[21] Appl. No.: 777,195

[22] Filed: Oct. 16, 1991

Related U.S. Patent Documents

Reissue of:

[64] Patent No.: 4,874,617
Issued: Oct. 17, 1989
Appl. No.: 128,633
Filed: Dec. 4, 1987

[51] Int. Cl.[5] ..... A23L 2/92

[52] U.S. Cl. ..... 426/49; 426/330.5; 426/492; 426/534; 426/599; 99/591

[58] Field of Search ..... 426/615, 49, 312, 330.5, 426/534, 492, 493, 494, 50, 599; 99/591

[56] References Cited

U.S. PATENT DOCUMENTS

| | | | |
|---|---|---|---|
| 1,053,955 | 2/1913 | Plunkett | 426/615 |
| 1,138,888 | 5/1915 | Plunkett | 426/615 |
| 2,192,273 | 3/1940 | Rey | 426/615 |
| 2,513,813 | 7/1950 | Milleville | 99/205 |
| 2,647,838 | 8/1953 | Stone | 426/615 |
| 2,714,573 | 8/1955 | Fessler | 202/39 |
| 3,087,822 | 4/1963 | Smith et al. | 99/155 |
| 3,223,533 | 12/1965 | Kelly | 99/140 |
| 3,223,534 | 12/1965 | Kelly | 99/140 |
| 3,248,233 | 4/1966 | Brent et al. | 99/205 |
| 3,544,337 | 12/1970 | Bundus | 426/658 |
| 3,627,011 | 12/1971 | Pond | 426/482 |
| 3,869,557 | 3/1975 | Vrespa | 426/524 |
| 4,273,792 | 6/1981 | Johnson et al. | 426/510 |
| 4,446,782 | 5/1984 | Black | 99/591 |
| 4,447,530 | 5/1984 | Young | 426/52 |

FOREIGN PATENT DOCUMENTS

| | | |
|---|---|---|
| 698598 | 12/1964 | Canada . |
| 982715 | 2/1965 | United Kingdom . |

OTHER PUBLICATIONS

Vequez J of Food Technology (1981), 16:115-125.
Munyanganizi Ind. Alumen Agric. 93(6) 707-711.
Merory 1960 Food Flavorings, Composition Manufacture and Use, AVI Publishing Company, Inc., Westport Ct., pp. 63-65.
Enzyme Topics, No. 3, May 1964, Rohm & Haas Company, Philadelphia, Pa., p. 1.
CA 77(3) 18149e.
CA 103(9) 70011y.
CA 103(21) 177203q.
CA 103(23) 195166j.
CA 85(17) 122065a.
CA 89(25) 213876q.
CA 90(7) 53346g.
CA 95(9) 78721s.
Bannar 1980, Food Engineering 52(11), p. 23.
Von Loesecke, 1949, Bananas Chemistry, Physiology, Technology, Interscience Publishers, NY, pp. 107-108, 127-141.
Bomben et al., Food Technol., "Vacuum Stripping of Aromas", 20:125 (1966).
Claffey et al., USDA/ARS, "An Improved Experimental Unit for Recovery of Volatile Flavors", 73:19.
Dimick et al., Ind. Eng. Chem. "A Laboratory Continuous Distillation Column"; 44:2487 (1952).
Eisenhardt et al., USDA/ARS, "Frozen High-Density Fresh Flavor Peach Concentrate by a Continuous Process", 73:21 (1958).
Eskew, In: Chemistry of Natural Food Flavors, a Symposium, "Preparation and Applications of Flavor Concentrates from Deciduous Fruits", p. 113, (May 1957).
Eskew et al., Food Engin., "Concentrates, Strips Flavor in 1 Pass Without Vacuum", 31:70 (Jan. (1959).
Eskew et al., USDA/AIC, "Preparation of Full-Flavor Grape Juice Concentrates", 301.

(List continued on next page.)

*Primary Examiner*—Carolyn Paden
*Attorney, Agent, or Firm*—Fish & Richardson

[57] ABSTRACT

A process for obtaining banana juice, banana essences and/or de-flavored banana juice from whole, ripe bananas is disclosed.

15 Claims, 8 Drawing Sheets

OTHER PUBLICATIONS

Eskew et al., USDA/AIC, "High Density Full-Flavor Grape Juice Concentrate", 342.
Eskew et al., USDA/AIC, "High Density Full-Flavor Apple Juice Concentrate", 315.
Leveringon et al., Queensland J. of Agricul. Sci., "An Experimental Pineapple Juice Concentrate Plant Incorporating Flavor Recovery", 21:33, (1964).
Martel, Ind. Aliment. Agric. (Paris), "Industrial Techniques for Recovering Fruit Aromas-1st Part", 87:1069, (1970).
Martel, Ind. Aliment Agric. (Paris), "Industrial Techniques for Recovering Fruit Aromas", 88:683, (1971).
Milleville et al., USDA/AIC, "Recovery and Utilization of Natural Apple Flavors", 63, (1944).
Morgan et al., Food Technol., "Studies on the Recovery of Essence from Florida Orange Juices", 7:332, (1953).
Mottern, The Fruit Prod. J. and Am. Vinegar Indus., "Concentrated Apple Juice", p. 68 (Nov. 1937).
Phillips et al., Food Technol., "Recovery of Fruit Essences in Preserve Manufacture", 6:210, (1952).
Roger, Food Technol., "The Recovery of Methyl Anthranilate in Concord Grape Essence", 15:309, (1961).
Roger et al., Food Technol., "Designing Distillation Equipment for Volatile Fruit Aromas", 19:69, (1965).
Sulc, Confructa Studien, "Frunchtasaftkonzentrierung und Fruchtaroma-Separierung", 28:258, (1984).
Walker, Volatile Flavor Recovery, "Fruit and Vegatable Juice Processing Technology", pp. 358-370 (1961).
Walker et al., Food Technol., "Preparation of a Frozen Apple Juice Concentrate", 5:148, (1951).
Walker et al., Food Technol., "A Laboratory Fruit Essence Recovery Unit", 9:87, (1955).
Drawert et al., Biogenesis of Aroma Compounds in Plants and Fruits, "Effect of Particle Size on Aroma Biosynthesis in Fruit Tissue", 176:275, (1983).
Issenberg et al., Agric. Food Chem., "Volatile Components of Bananas", 11:2, (1963).
Labows et al., Am. Lab., "Direct Analysis of Food Aromas", 15:56, (1983).
McCarthy et al., Proceedings First International Congress Food Sci. and Technol., "Correlation of Gas Chromatographic Data with Flavor Profiles of Fresh Banana Fruit", p. 379, (1962).
Moshonas et al., J. Agric. Food Chem., "Direct Gas Chromatographic Analysis of Aqueous Citrus and Other Fruit Essences", 32:526, (1984).
Anon. Fluessiges Obst, "Nueue Aromarueckgewinungs-und Endampfanlage Fuer Fruchtmark in Meran", 43:162 (1976).
Bomben et al., Fruchtsaft-Industrie, "Operating Conditions for Aroma Recovery by New Vacuum Stripping Method and Evaluation of Aroma Solutions", 12:44, (1967).
Eskew et al., Ind. Eng. Chem., "Frozen Concentrated Apple Juice", 43:2397, (1951).
Phillips et al., Ind. Eng. Chem., "Experimental Unit for Recovery of Volatile Flavors", 43:1672, (1951).
Samsonova et al., Ovoshchesushil Noi Promyshlennosti, "Recovery of Aromatic Substances During Manufacture of Stewed Fruit and Jam", 14:18, (1971).
Wolford et al., 17th Ann. Citrus Processores Meeting, Lake Alfred, FL, 10/4, "A Vacuum System for Removal and Concentration of Citrus Juice Essences,—General Description and Operational Data", (1966).
Wolford et al., FL Citrus Commission Report, "Recovered Volatiles from Citrus Juices", (1966).
Dimitriou, "New Evaporator Type for the Fruit Juice Industry", pp. 3-11, (1984).
Milout—Haifa Bay Settlement Development Co. Promotional and Advertising Literature.
Brown, Product Literature.
Baader, Product Literature.
Beehive Machinery, Inc., Product Literature.
Anon, Industrielle Obst-und Gemueseverwertung, "Aromarueckgewinnungs-und Eindampfanlage fuer Furchtmark", 61:545, (1976).
Von Loesecke, Harry W., *Bananas—Chemistry, Physiology, Technology* (Interscience Publishers, Inc. 1950), p. 30.

GI: GLYCOL INLET
GR: GLYCOL RETURN

BANANA PROCESSING

Matter enclosed in heavy brackets [ ] appears in the original patent but forms no part of this reissue specification; matter printed in italics indicates the additions made by reissue.

BACKGROUND OF THE INVENTION

The invention relates to a method for obtaining banana juice and banana essences from bananas.

Bananas consist of a pulp covered by a peel. The pulp includes water, sugars, cellulosic constituents, residual starch, and flavor and aroma components which include, in general, a variety of alcohols, aldehydes, esters, and ketones. The peel of a ripe banana consists of an outer epidermis, a yellow colored layer (chlorenchyma) and a white inner layer (parenchyma). Mixtures of aroma components essentially free of sugars and other solid constituents of the pulp are known as banana essences.

It is known that banana essences can be obtained from ripened bananas, after the peels are manually removed and discarded, by homogenizing the pulp and recovering volatile components from the homogenized pulp by drawing off the volatile components under vacuum.

It is also known that banana juice can be obtained from ripened bananas, after the peels are manually removed and discarded, by homogenizing the pulp; digesting the homogenized pulp with an enzyme to cause the pulp to evolve into a solid and a liquid portion (the banana juice); and separating the liquid portion from the solid portion.

The term banana juice, as used herein, refers to a solution including the water and sugars from the banana pulp, essentially free of any components of the pulp that are insoluble in water.

The term de-flavored banana juice, as used herein, means banana juice that is essentially free of the volatile flavor and aroma components of the pulp.

The term concentrated de flavored banana juice, as used herein, is the de flavored banana juice concentrated removing part of the water by evaporation.

SUMMARY OF THE INVENTION

In general, the invention features, in one aspect, an improved process for obtaining banana juice from a banana, the method including placing a quantity of whole ripe bananas into a mechanical peeling device that separates banana pulp from the outer epidermis and chlorenchyma of banana peels; digesting the pulp with an enzyme to cause the pulp to evolve into a solid portion and a liquid portion, the liquid portion including the banana juice; and separating the liquid portion from the solid portion. Preferably the mechanical peeling device separates the pulp and parenchyma from the other peel components and a mixture of pulp and parenchyma are digested with the enzyme.

The invention features, in another aspect, a process for obtaining a banana essence from the outer epidermis and the chlorenchyma of banana peels, the method including peeling the outer epidermis and chlorenchyma from whole, ripe bananas, homogenizing the outer epidermis and chlorenchyma, and recovering from the homogenized material volatile components that include the banana essence.

The invention features, in another aspect, a process for obtaining a banana essence from banana pulp, the method including peeling the outer epidermis and chlorenchyma from whole ripe bananas to isolate the banana pulp; digesting the pulp with an enzyme to cause the pulp to evolve into a liquid portion and a solid portion; and, during the digestion, recovering, from the pulp, volatile components that include banana essence. Preferably a mechanical peeling device is used for separation of the parenchyma and pulp from the other peel components, both the pulp and parenchyma being digested with the enzyme to cause the pulp and parenchyma to evolve into a liquid and a solid portion; and during the digestion the banana essence is recovered from the pulp-parenchyma mixture.

The invention features, in another aspect, an improved process for obtaining a banana essence from a banana, the method including placing a quantity of whole ripe bananas into a mechanical peeling device that separates banana pulp from the outer epidermis and chlorenchyma of banana peels; homogenizing the pulp and parenchyma; and recovering from the homogenized pulp and parenchyma volatile components including a banana essence.

The invention features, in another aspect, a process for obtaining banana essences and de-flavored banana juice from a banana, the method including placing a quantity of whole, ripe bananas into a mechanical peeling device; within the device, separating banana pulp and the parenchyma of banana peels from the outer epidermis and chlorenchyma of banana peels; homogenizing the pulp and parenchyma; recovering from the homogenized pulp and parenchyma volatile components including a first banana essence; digesting the pulp and parenchyma, with an enzyme to cause the pulp and parenchyma to evolve into a solid portion and a liquid portion, the liquid portion including banana juice; during the digestion, recovering from the pulp and parenchyma volatile components including a second banana essence; separating the solid portion from the liquid portion; and removing from the liquid portion, volatile components including a third banana essence, thereby concentrating the liquid portion, the concentrated liquid portion including the concentrated, de-flavored banana juice.

The invention also features methods of peeling bananas using mechanical peeling devices.

The preferred mechanical peeling device is a pulper that includes a screen having openings (preferably 0.25 inch or less in diameter) that preclude the outer epidermis and chlorenchyma of the peels from passing through, but allows the pulp and parenchyma to pass through.

The use of a mechanical peeling device provides a very efficient method of separating the outer epidermis and chlorenchyma from banana pulp. The device allows the parenchyma, which also contains banana juice and essence, to be separated from the other peel components. Together, the pulp and parenchyma generally constitute 90–95% of the weight of the banana, and accordingly, the recovery of the essences and juice is high. Large quantities of bananas are readily peeled using the device, with a minimum of waste.

Recovering banana essences from the banana peels, enzyme digested pulp, and from the banana juice while being concentrated increases the total yield of banana essences. Moreover, each type of essence has its own distinct properties. The clarified banana juice obtained can be mixed with other types of juices to obtain a good tasting product.

Other features and advantages of the invention will be apparent from the following description of a presently preferred embodiment, and from the claims.

DESCRIPTION OF THE PREFERRED EMBODIMENT

The drawings are described first.

FIGS. [12] *12a* and 12b are sectional views of alternate embodiments of mechanical banana peelers.

Figure 1:
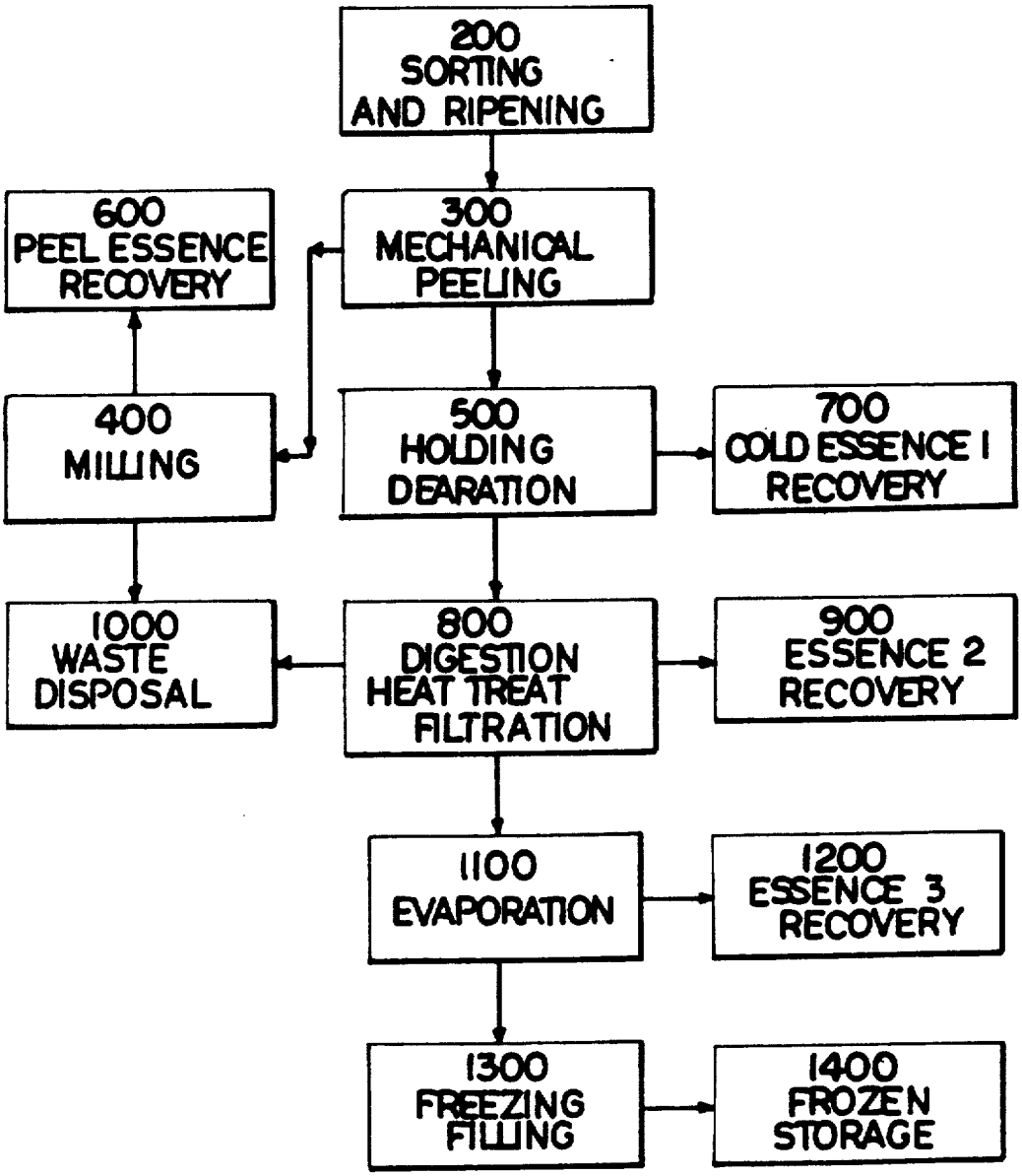
FIG. 1 is a block diagram of the steps in the banana juice and banana essence recovery process.

Referring briefly to FIG. 1, the process steps of the invention for banana juice and essence recovery are shown in a block diagram. Bananas are sorted and ripened (200). Selected bananas are peeled mechanically (300). The outer epidermis and chlorenchyma of the peels are homogenized by milling (400), and a peel essence recovered from the homogenized mixture (600). Solid wastes are discarded (1000). The pulp and parenchyma from the peeling step (300) are homogenized and deaerated at a vacuum holding station (500). A first banana essence is recovered from the volatile components (700). The homogenized pulp-parenchyma mixture is subjected to enzyme digestion and filtration (800), and a second banana essence is recovered from the volatile components (900). Solid wastes from step 800 are discarded (1000). The clarified banana juice from step 800 is concentrated (1100) to a de flavored, concentrated banana juice. A third banana essence is recovered (1200) from the evaporated volatiles. The concentrated banana juice is collected and frozen (1300) and stored (1400) for future use.

More specifically, acceptable bananas are ripened (using ethylene gas to trigger the ripening) and stored under conventional temperature and air circulation conditions. The best yield of essences and juice is achieved from bananas ripened to have a peel color index of at least 5, more preferably of about 7. A peel color index of 5 means the peel is all yellow with some traces of green at the tips. A peel color index of 7 means the peel is completely yellowed and is covered with brown freckles.

The bananas are washed with fresh water, and moldy, overripe, or otherwise unacceptable bananas are removed.

Figure 2:
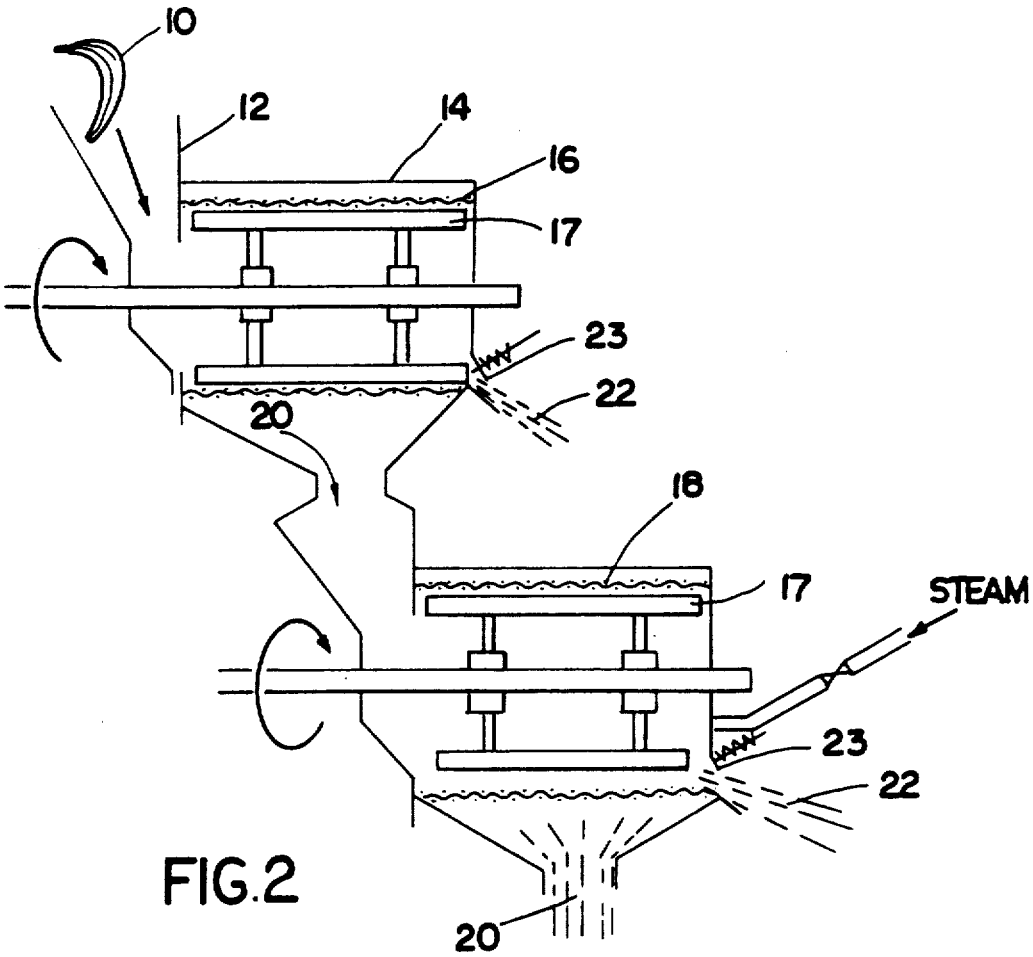
FIG. 2 is a sectional view of a pulper and a finisher used as a mechanical banana peeler.

Referring to FIG. 2, the bananas 10 are fed into the feeder hopper 12 of mechanical peeling device 14. The device includes, in series, a screen 16 having 0.125 to 0.25 inch diameter openings and a screen 18 having 0.027 to 0.045 inch diameter openings. The rotating paddles or brushes 17 force a mixture 20 of the banana pulp and the parenchyma of the peels through the screens, while the outer epidermis and chlorenchyma of the peels (mixture 22) and other wastes are carried along the screen to a discharge outlet 23. The process is preferably carried out under an atmosphere without oxygen (e.g., under steam) to avoid darkening that occurs when oxygen contacts the banana pulp in the presence of enzymes contained in the pulp.

Devices of the type shown in FIG. 2 are available, e.g., from FMC Corp., of Homer City, Pa., (Model No. 100) or from Brown Machine, of Beaverton, Mich.

Figure 3:
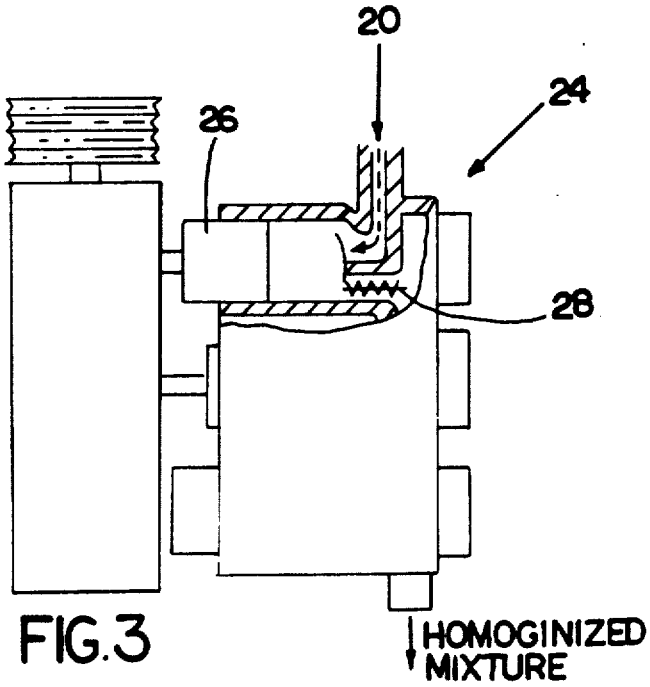
FIG. 3 is a partially sectional view of a homogenizer.

Referring to FIG. 3, the pulp and parenchyma mixture 20 from the mechanical peeling device is passed through a homogenizer 24. Pistons 26 homogenize the mixture 20 by forcing it through small openings 28, e.g., 0.125 inch diameter, at high pressure, e.g., 1,000 psi.

Figure 4:
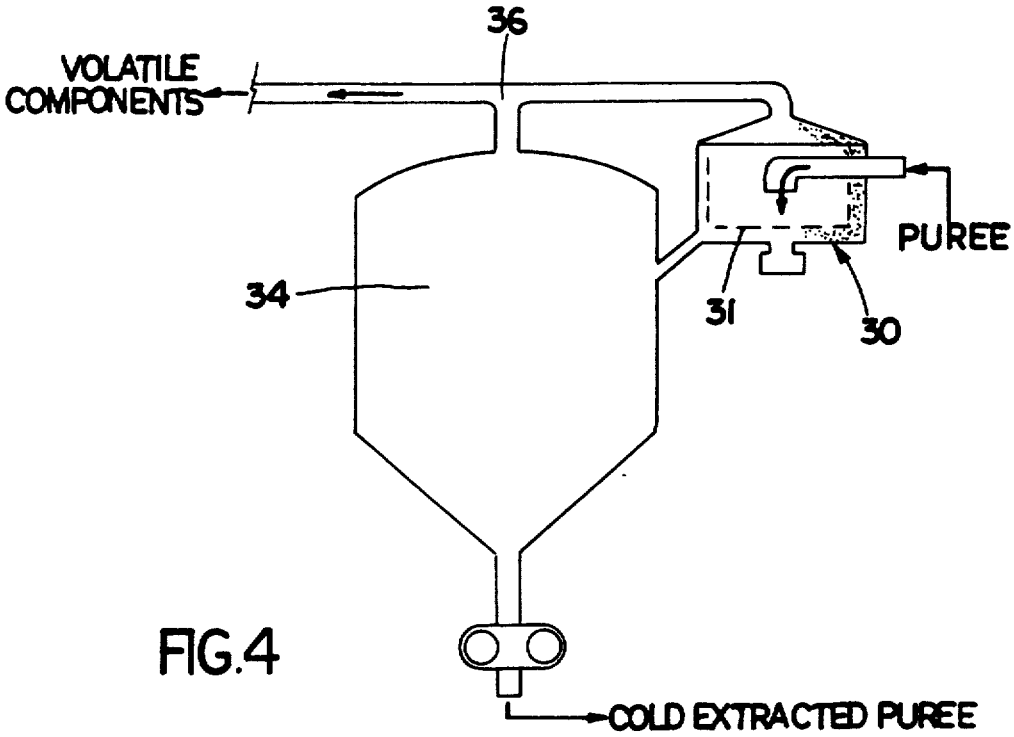
FIG. 4 is a sectional view of a deaerator and holding tank.

Referring to FIG. 4, the homogenized pulp parenchyma mixture (puree) is next pumped into a perforated basket 31 within the chamber of a deaerator 30. A vacuum pump 32 (FIG. 5) maintains the pressure inside the deaerator below about 5 in. Hg. This low pressure is maintained in the holding tank as well. Rotation of basket 31 disperses the puree into fine particles as it is passed through the perforations to form a film along the walls of the internal surface of the deaerator. Volatile components, including flavor and aroma components, are drawn off through vacuum line 36. The deaerated pulp then drops by gravity into vacuum holding tank 34, which is also connected to the pump 32 through line 36. Further volatile components are drawn off from the puree in the holding tank for about one half hour.

Figure 5:
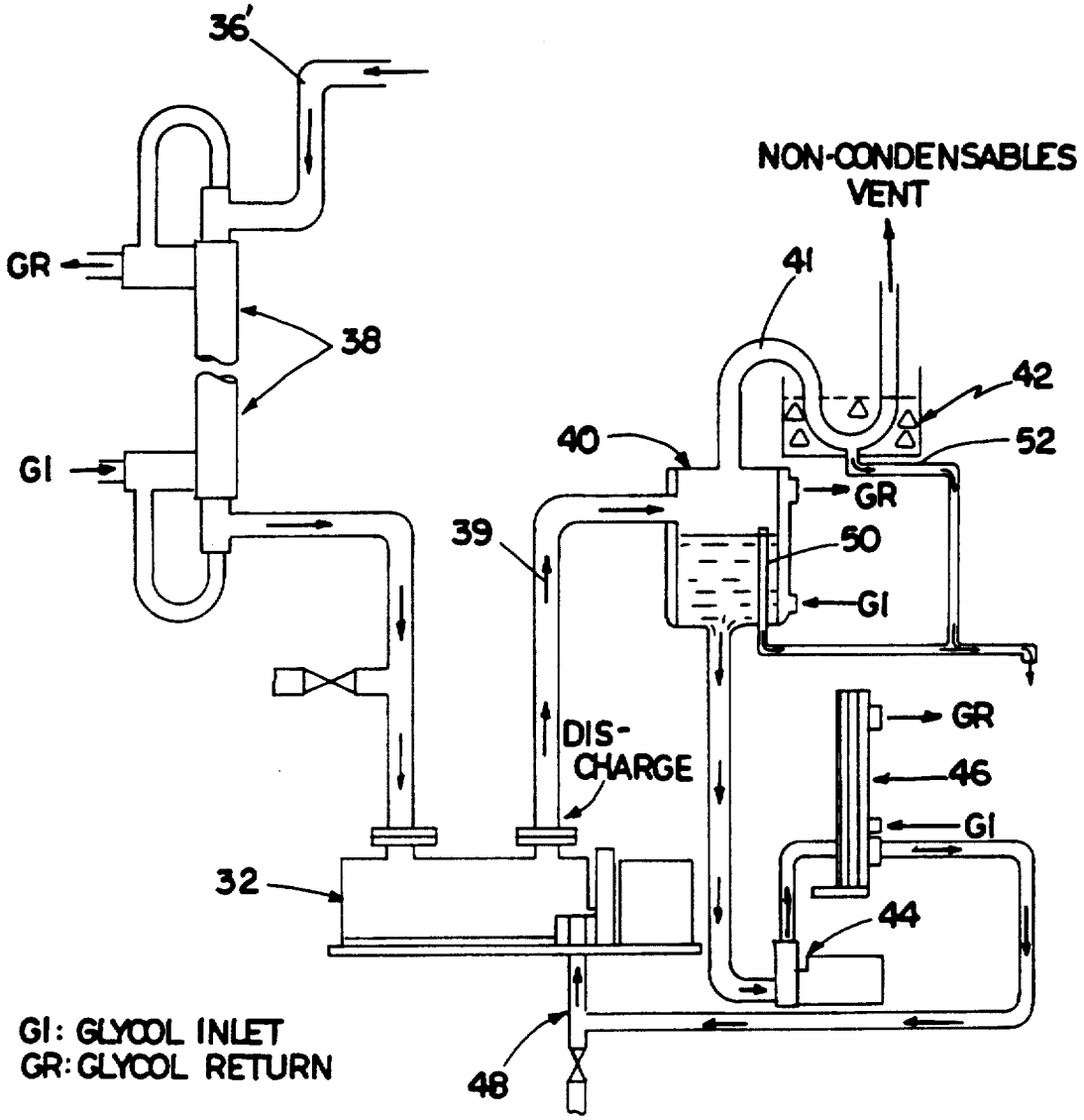
FIG. 5 is a perspective view, partially in section, of banana essence recovery apparatus.

Referring to FIG. 5, the pump 32 pulls the volatile components in the tube 36 through concentric tube heat exchanger 38. The exchanger 38 has three concentric tubes; a cooling fluid (e.g., a water and ethylene glycol mixture) circulates inside the innermost tube and between the two outer tubes. The volatile components flow through the exchanger and are partially condensed. The remaining vapors and the condensate flow into the pump 32, where they are brought into contact with a cold water/essence solution that is the working fluid of the vacuum pump. The essence present in the condensed vapors is absorbed by the working fluid. Uncondensed vapors and working fluid are pumped through the discharge tube 39 into the jacketed tank 40, which is also cooled by a circulating cooling fluid. The vapors separate from the water/essence, and a stream of the vapors pass through a tube 41 into an ice trap 42 to remove further traces of essence. The water/essence solution is recirculated, by means of a pump 44, through a plate heat exchanger 46, which is also cooled by a circulating cooling fluid. Finally the water/essence solution is recirculated to the pump 32 through the return line 48.

The condensation of the volatile components increases the volume of the water/essence solution in the system. After the volume reaches a previously determined level, the solution overflows into a collection tube 50 in the jacketed tank 40. An additional collection tube 52 in the tube 41 drains condensates in the tube 41 into the collection tube 50. The product that flows from the tube 50 is a high quality banana essence.

Figure 6:
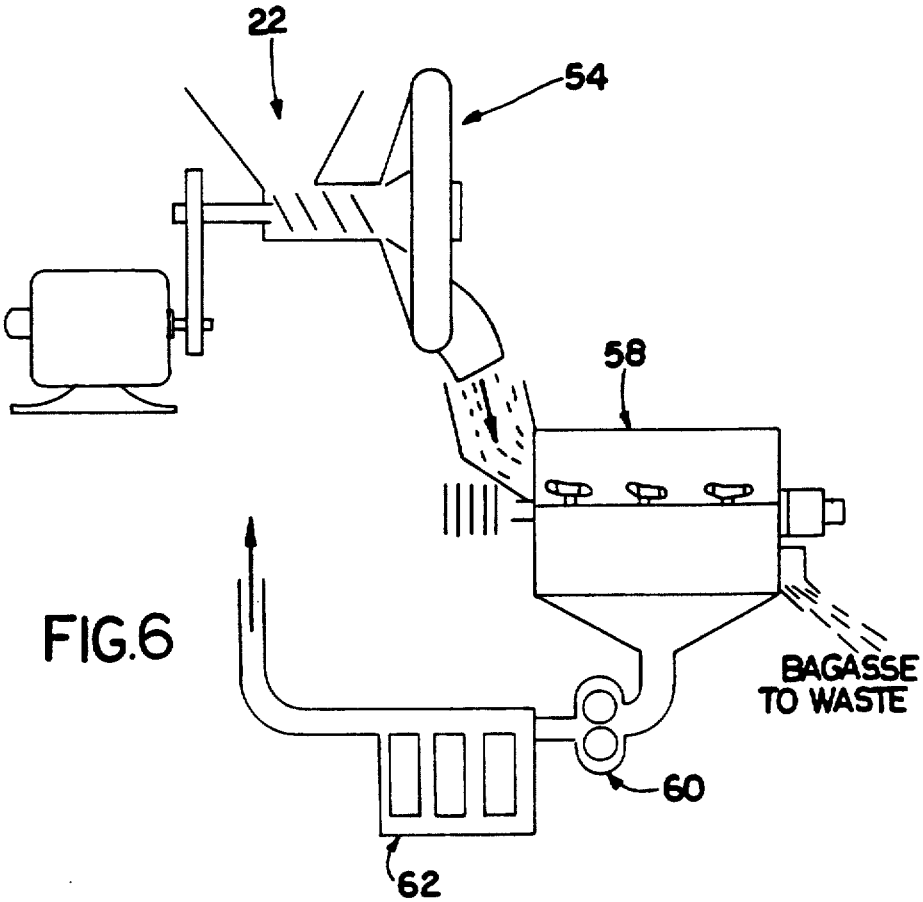
FIG. 6 is a perspective view of an apparatus for grinding, screening, and homogenizing prior to obtaining banana essence from banana peels.

Referring to FIG. 6, the outer epidermis-chlorenchyma mixture 22 is combined with water and fed to an attrition mill 54. The resulting slurry passes into a finisher 58. The fine portion of slurry 56 is passed by pump 60 into an homogenizer 62; the coarse remainder of the mixture 22 is discarded at the end of the finisher. The fine slurry is homogenized and discharged into a deaerator holding tank arrangement of the same design as described above with reference to FIG. 4. The volatile components are passed to a pump of the same design as described above with reference to FIG. 5 to recover a banana essence.

Figure 7:
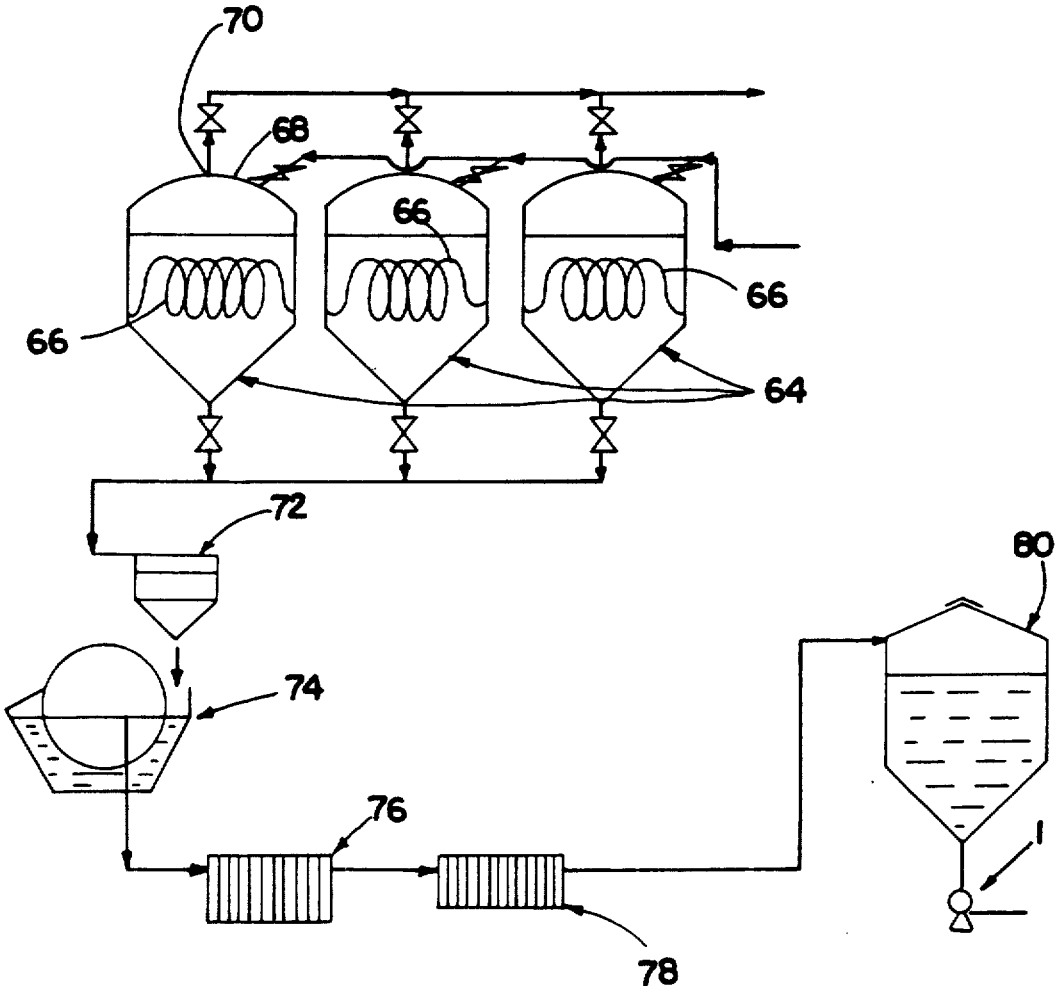
FIG. 7 is a perspective view, partially in section, of an apparatus for enzyme digestion of banana pulp.

The deaerated banana puree is drawn off from the bottom of the tank 34 (FIG. 4) by means of a pump (not shown), and is fed to one of several digestion tanks 64 (FIG. 7) to be treated with a pectinase (e.g., CLAREX L, a trademark of Miles Laboratories, Inc.) to facilitate the separation of the solid portion of the puree from the liquid portion (the banana juice). Tanks 64 are equipped with rotary coils 66 to adjust the temperature inside the vat to the optimum for the activity of the enzyme. Tanks 64 also are fitted with covers 68 and venting means 70.

Typically, the digestion is carried out at 120° F. for 2 hours, at which time the digested puree is passed from the tanks through a screw press 72 to remove the bulk of the banana juice. The cloudy juice from the screw press passes to a rotary vacuum filter 74 that has been precoated with diatomaceous earth (the earth suspension tank, agitator, and pump are not shown). The deflavored banana juice from the filter 74 is passed through a plate heat exchanger 76 for coagulation of any proteins present. The pasteurized juice is passed through a polishing filter 78 and finally to a surge tank 80.

Figure 8:
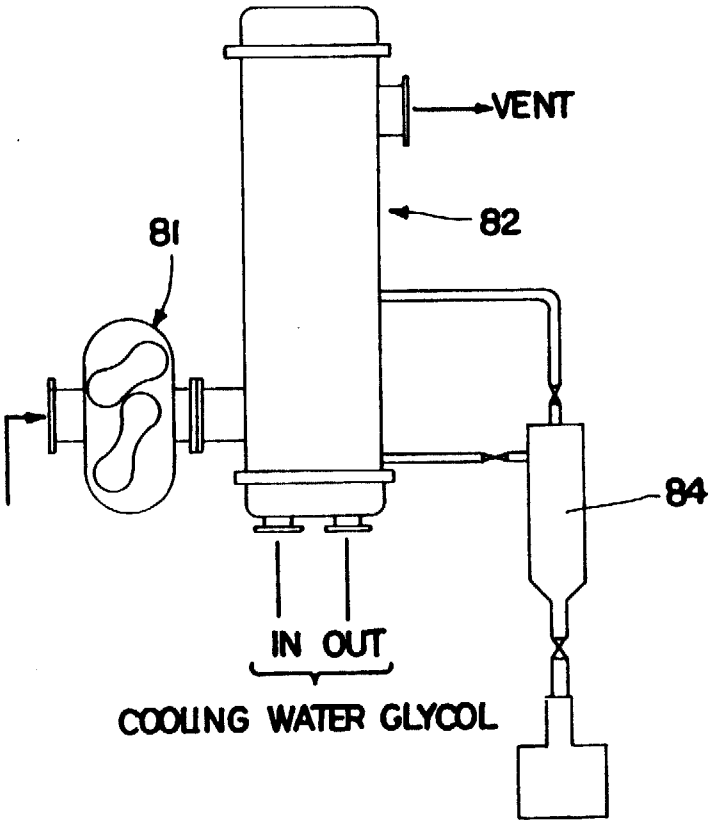
FIG. 8 is a perspective view, partially in section, of an apparatus for recovery of banana essences.

Referring to FIG. 8, as the digestion in tanks 64 procedes, volatile components exit via vents 70 to be gently forced by a blower 81 through a water and glycol cooled condenser 82. A banana essence is condensed and is collected in a tank 84.

Figure 9:
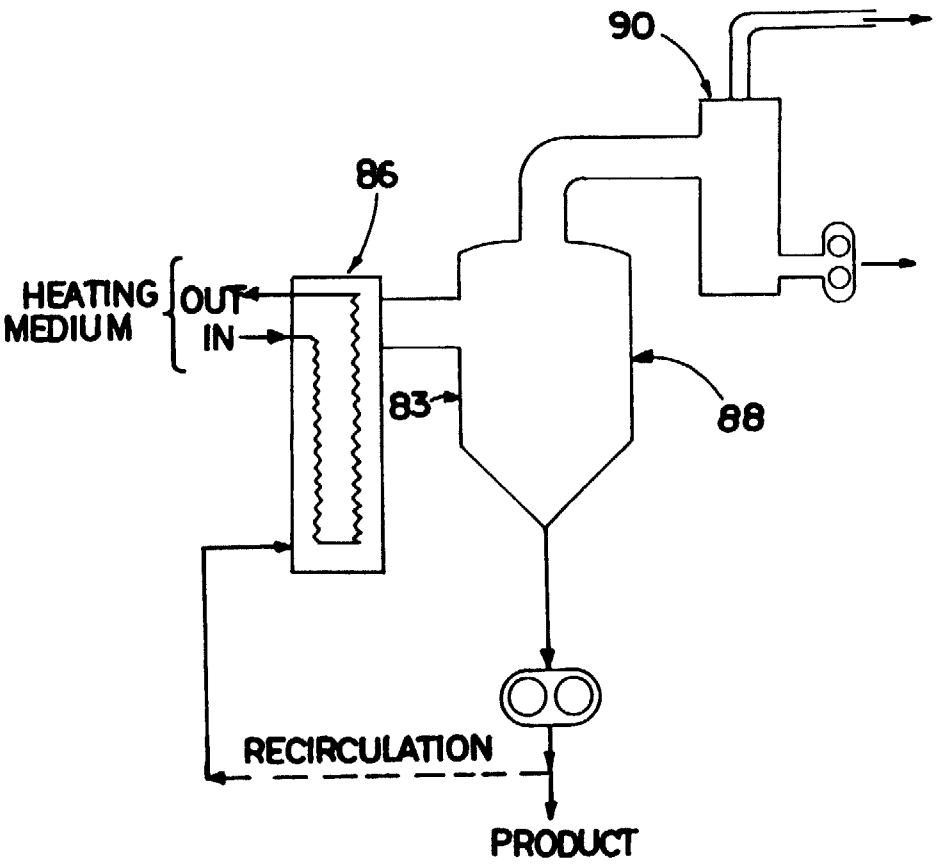
FIG. 9 is a sectional view of an apparatus for concentrating banana juice.

Referring to FIG. 9, the clarified banana juice enters (83) from surge tank 80 is fed to an evaporator consisting of a plate heat exchanger 86 and an evaporator body 88. The more volatile components of the juice, plus some water, are vaporized and flow to a partial condenser 90, which condenses most of the water vapor while not condensing the more volatile components that include a banana essence.

Figure 10:
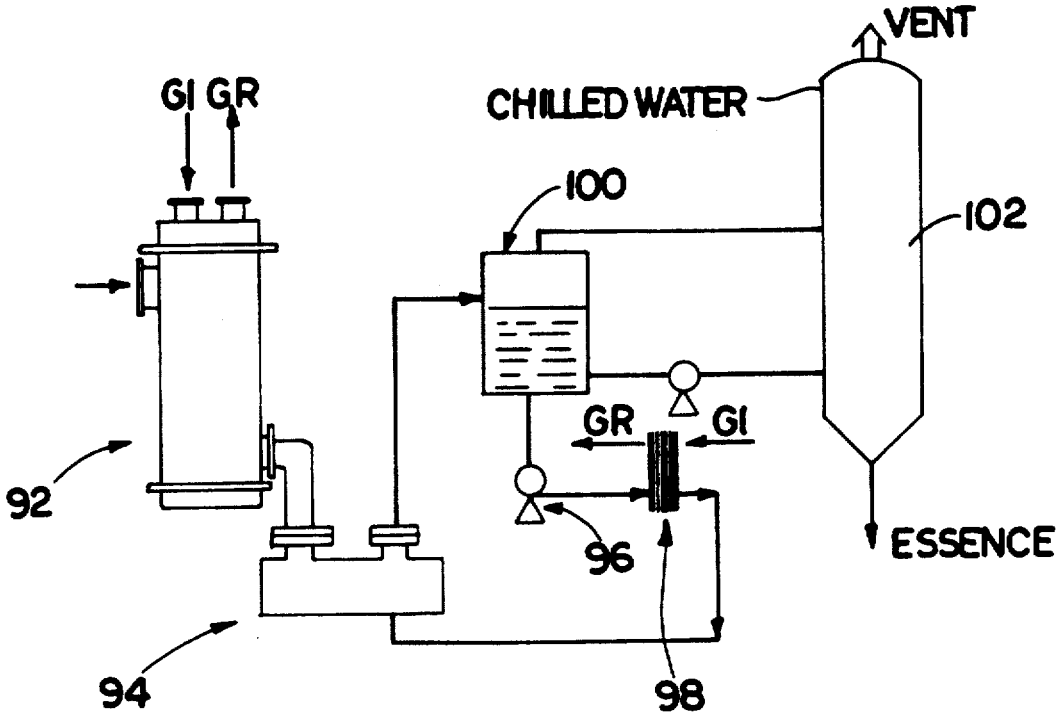
FIG. 10 is an apparatus for recovering banana essences.

Referring to FIG. 10, the vapors from the condenser 90 are fed to a second condenser 92, which is cooled with a water glycol mixture. Condensates and remaining vapors are drawn into a liquid ring vacuum pump 94, whose working fluid is a water banana essence mixture. A pump 96 forces the working fluid to flow through a plate heat exchanger 98 and through the pump 94. The discharge from the pump 94 passes to a liquid vapor separator 100. The vapor stream from the separator is fed to a scrubber 102, where the vapors are scrubbed with chilled water and vented. When a sufficient quantity of the banana essence has collected in the working fluid, the liquid in the separator is pumped to the bottom of the scrubber and collected, mixed with the scrubbing water, as a banana essence product.

Figure 11:
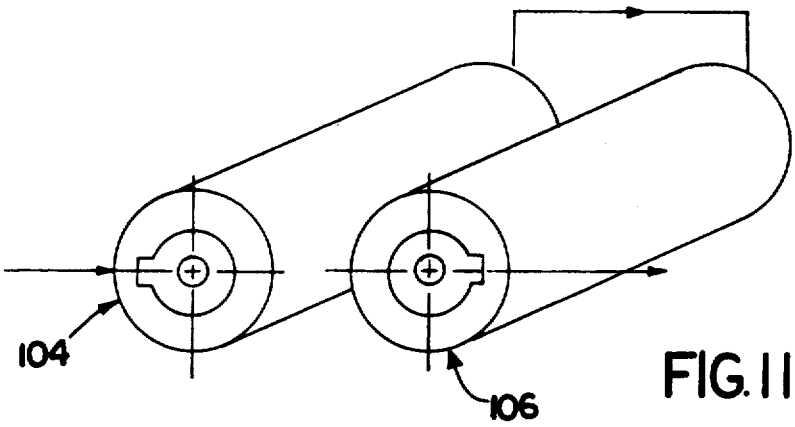
FIG. 11 is a perspective view of a banana juice collection apparatus.

Referring to FIG. 11, the concentrated, de-flavored banana juice pumped from the bottom of evaporator body 88 is passed through a glycol-cooled swept surface exchanger 104 and then through an ammonia-cooled swept surface exchanger 106, where the juice is cooled to a temperature of 32° to 40° F.

OTHER EMBODIMENTS

Figure 12A:
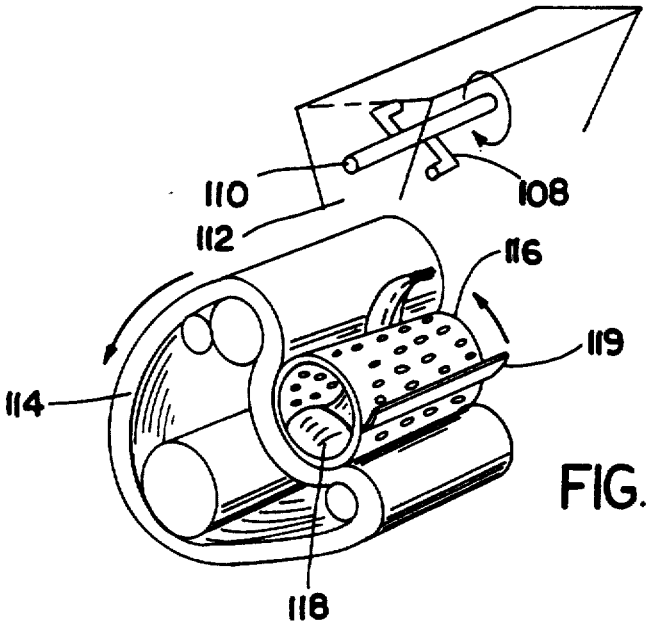

Other embodiments are within the following claims. For example, other mechanical peeling devices can be used. One such device 106 is shown in FIG. 12A. In using the device, whole clusters or hands of ripe bananas are fed to the machine. Pre-breaker fingers 108 mounted in a slowly rotating axis 110 prevent the bridging of the clusters in the throat 112 of the device. The clusters fall into a space formed between a strong but flexible belt 114 and a perforated drum 116 having 3 to 5 mm diameter openings. As the drum rotates, the belt forces the banana pulp and the parenchyma through the perforations into the drum 116. The mixture is removed by a stationary hanger 118. The outer epidermis and chlorenchyma of the peels and the end material of the bananas remain adhered to the outside of the drum to be scraped off by a knife. A device 106 is available from, e.g., Baader, of West Germany (Model No. 896).

Figure 12B:
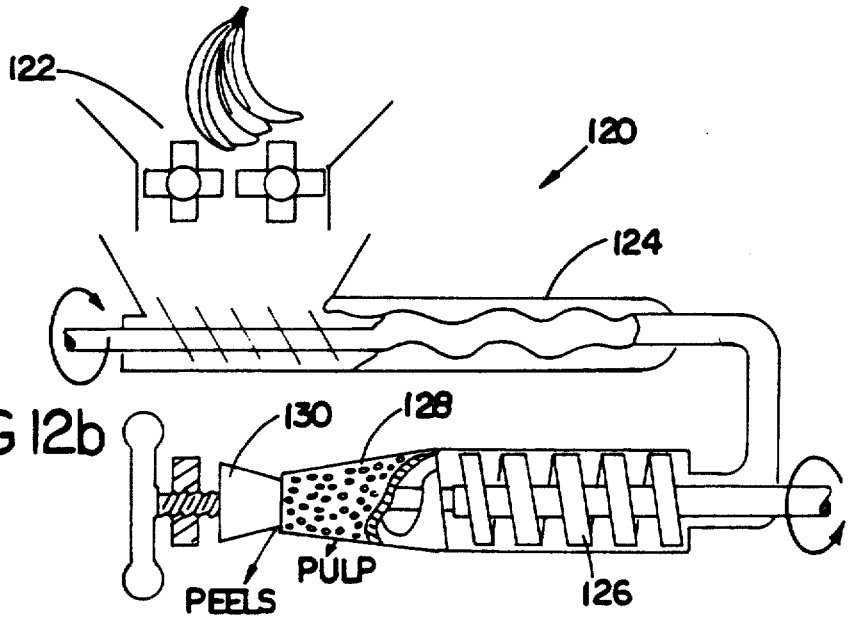

In a second alternative peeling device 120, shown in FIG. 12B, clusters of bananas are fed to a breaking mechanism 122, then, by positive displacement pump 124, e.g., a MOYNO® pump from Robbins & Myers, Inc. of Springfield, Ohio, to an extruding-type screw conveyor 126. This conveyor operates inside a tapered cone 128 provided with a multiplicity of small (0.5 mm) holes. The pulp and parenchyma of the bananas are forced through the holes in the cone to the outside. The outer epidermis and chlorenchyma of the peels travel to the end of the cone and are discarded against an inverted back-pressure cone 130 which can be adjusted to vary the pressure inside the perforated cone. An advantage of device 120 is that the pulp may be deseeded during the operation. A device 120 is available, e.g., from Beehive Machinery, Inc. (RSTD-06 Food Processing Machine).

I claim:

1. A process for obtaining banana juice from a banana, said process comprising providing whole, ripe bananas, each said banana comprising a peel about a pulp, said peel comprising an outer epidermis, a chloroenchyma, and a peel parenchyma;

placing a quantity of said bananas into a mechanical peeling device;

within said mechanical peeling device, separating banana pulp and peel parenchyma from the other epidermis and the chlorenchyma of banana peels;

digesting said pulp and peel parenchyma with an enzyme to cause said pulp and peel parenchyma to evolve into a solid portion and a liquid portion, said liquid portion comprising said banana juice;

separating said liquid portion from said solid portion; and removing by vacuum deaeration and evaporation from said liquid portion volatile components comprising a banana essence and water, thereby concentrating said liquid portion, said concentrated liquid portion comprising concentrated, de-flavored banana juice.

2. A process for obtaining banana juice from a banana, said method comprising providing whole, ripe bananas, each said banana comprising a peel about a pulp, said peel comprising an outer epidermis, a chlorenchyma, and a parenchyma;

placing a quantity of said bananas into a mechanical peeling device;

within said device, separating banana pulp from the outer epidermis and the chlorenchyma of banana peels;

digesting said pulp with an enzyme to cause said pulp to evolve into a solid portion and a liquid portion, said liquid portion comprising said banana juice, and, during said digestion with said enzyme, removing by suction and condensation from said pulp volatile components comprising a banana essence; and separating said liquid portion from said solid portion.

3. A process for obtaining banana juice from a banana, said method comprising providing whole, ripe bananas, each said banana comprising a peel about a pulp, said peel comprising an outer epidermis, a chlorenchyma, and a parenchyma;

placing a quantity of said bananas into a mechanical peeling device;

within said device, separating banana pulp from the outer epidermis and the chlorenchyma of banana peels;

homogenizing said pulp prior to digestion and, during said homogenizing, removing by vacuum deaeration and condensation from said pulp volatile components comprising a banana essence;

digesting said pulp with an enzyme to cause said pulp to evolve into a solid portion and a liquid portion, said liquid portion comprising said banana juice; and separating said liquid portion from said solid portion.

4. A process for obtaining a banana essence from a banana, said method comprising providing whole, ripe bananas, each said banana comprising a peel about a pulp, said peel comprising an outer epidermis, a chlorenchyma, and a parenchyma;

separating banana pulp from the outer epidermis and chlorenchyma of banana peels;

homogenizing said separated outer epidermis and chlorenchyma; and recovering by vacuum deaeration and condensation from said homogenized outer epidermis and chlorenchyma volatile components comprising said banana essence.

5. The process of claim 4, wherein said separating is done by means of a mechanical peeling device.

6. The process of claim 5, wherein said mechanical peeling device separates the parenchyma of banana peels and banana pulp from said chlorenchyma and said outer epidermis.

7. A process for obtaining a banana essence from a banana, said method comprising providing whole, ripe bananas, each said banana comprising a peel about a pulp, said peel comprising an outer epidermis, a chlorenchyma, and a parenchyma;

separating banana pulp from the outer epidermis and the chlorenchyma of banana peels;

digesting said pulp with an enzyme to cause said pulp to evolve into a liquid portion and a solid portion; and during said digestion, recovering by suction and condensation from said pulp volatile components comprising said banana essence from said pulp.

8. The process of claim 7, wherein said separating is done by means of a mechanical peeling device.

9. The process of claim 8, wherein said mechanical peeling device separates the parenchyma of banana peels and banana pulp from said chlorenchyma and said outer epidermis, said pulp and said parenchyma are digested with said enzyme, and said volatile components are recovered by vacuum deaeration and condensation from said pulp and said parenchyma.

10. A process for obtaining a banana essence from a banana, said method comprising providing whole, ripe bananas, each said banana comprising a peel about a pulp, said peel comprising an outer epidermis, a chlorenchyma, and a parenchyma;

placing a quantity of said bananas into a mechanical peeling device;

within said device, separating banana pulp and said parenchyma from the outer epidermis and the chlorenchyma of banana peels;

homogenizing said pulp and said parenchyma; and during said homogenizing, recovering, by vacuum deaeration and condensation, from said pulp and said parenchyma, volatile components comprising a banana essence.

11. A process for obtaining banana essences and de-flavored banana juice from a banana, said method comprising providing whole, ripe bananas, each said banana comprising a peel about a pulp, said peel comprising an outer epidermis, a chlorenchyma, and a parenchyma;

placing a quantity of said bananas into a mechanical peeling device;

within said device, separating banana pulp and the parenchyma of banana peels from the chlorenchyma and the outer epidermis of banana peels;

homogenizing said pulp and said parenchyma;

during said homogenizing, recovering, by vacuum deaeration and condensation, from said pulp and said parenchyma, volatile components comprising a first banana essence;

digesting said pulp and said parenchyma with an enzyme to cause said pulp and said parenchyma to evolve into a solid portion and a liquid portion, said liquid portion comprising banana juice;

during said digestion, recovering, by suction and condensation, from said pulp and said parenchyma, volatile components comprising a second banana essence;

separating said solid portion from said liquid portion; and removing, by vacuum evaporation, from said liquid portion, volatile components comprising a third banana essence, thereby concentrating said liquid portion, said concentrated liquid portion comprising said de-flavored banana juice.

12. The process of claim 11 further comprising the steps of homogenizing said chlorenchyma and said outer epidermis; and recovering by vacuum deaeration and condensation from said homogenized chlorenchyma and said outer epidermis volatile components comprising a fourth banana essence.

13. The process of claim 2, 6, 8, 10, or 11, wherein said banana pulp is separated from said outer epidermis and chlorenchyma by passing said banana through pulper means comprising screens having openings that preclude outer epidermis and chlorenchyma from passing through but allow pulp to pass through.

14. The process of claim 13, wherein said openings are 0.25 inch or less in diameter.

*15. A process for obtaining banana pulp from a banana, said process comprising:*

*providing whole, ripe bananas, each said banana comprising a peel about a pulp, said peel comprising an outer epidermis, a chlorenchyma, and a peel parenchyma;*

*placing a quantity of said bananas into a mechanical peeling device;*

*within said mechanical peeling device, separating banana pulp and peel parenchyma from the outer epidermis and the chlorenchyma of banana peels; and*

*recovering said banana pulp and peel parenchyma.*

* * * * *